US006980926B1

(12) United States Patent
O'Brien, Jr.

(10) Patent No.: US 6,980,926 B1
(45) Date of Patent: Dec. 27, 2005

(54) DETECTION OF RANDOMNESS IN SPARSE DATA SET OF THREE DIMENSIONAL TIME SERIES DISTRIBUTIONS

(75) Inventor: Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/679,686

(22) Filed: Oct. 6, 2003

(51) Int. Cl.[7] .............................................. G06F 17/00
(52) U.S. Cl. ....................... 702/179; 702/181; 702/189
(58) Field of Search .......................... 702/179, 69, 181, 702/189, 176, 178, 191, 193, 195; 367/135, 367/901, 131, 92, 910, 900, 21; 342/107, 342/196, 192; 703/2, 6; 708/200, 520, 308, 708/401; 382/181, 228, 209, 224, 225; 375/346; 706/20, 22

(56) References Cited

U.S. PATENT DOCUMENTS

| | | | | |
|---|---|---|---|---|
| 5,956,702 A * | 9/1999 | Matsuoka et al. | ............ | 706/22 |
| 6,397,234 B1 * | 5/2002 | O'Brien et al. | ............ | 708/200 |
| 6,466,516 B1 * | 10/2002 | O'Brien et al. | ............ | 367/131 |
| 6,597,634 B2 * | 7/2003 | O'Brien et al. | ............ | 367/135 |

* cited by examiner

*Primary Examiner*—Hal Wachsman
(74) *Attorney, Agent, or Firm*—James M. Kasischke; Michael P. Stanley; Jean-Paul A. Nasser

(57) ABSTRACT

A two-stage method is provided for automatically characterizing the spatial arrangement among data points of a three-dimensional time series distribution in a data processing system wherein the classification of this time series distribution is required. The invention utilizes two-stage method Cartesian grids to determine (1) the number of cubes in the grids containing at least one input data point of the time series distribution; (2) the expected number of cubes which would contain at least one data point in a statistically determined random distribution in these grids; and (3) an upper and lower probability of false alarm above and below this expected value utilizing a second discrete probability relationship in order to analyze the randomness characteristic of the input time series distribution.

15 Claims, 5 Drawing Sheets

BINOMIAL TABLE FOR $k=30, \Theta=.632, \alpha=.01$

| m | $P(M=m)=\binom{k}{m}\Theta^{m}(1-\Theta)^{k-m}$ | $P(M\le m)=\sum_{0}^{m} P(M=m)$ (CUMULATIVE) | $P(M\ge m)$ |
|---|---|---|---|
| 0 | 0 | 0 | |
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| 7 | 0 | 0 | |
| 8 | 0 | 0 | |
| 9 | .00002 | .00005 | |
| 10 | .00063 | .00068 | |
| 11 | .00197 | .00265 ($m_1$), $P(M\le m)\le\alpha_0/2$ | |
| 12 | .00536 | .00801 | |
| 13 | .0334 | .0551 | |
| 14 | .02661 | .04738 | |
| 15 ∘ ∘ ∘ 24 | DATA NOT SHOWN FOR m=15 to 24 | | |
| 25 | .01005 | .98560 | .03878 |
| 26 | .00332 | .99566 | .01440 |
| 27 | .00085 | .99898 ($m_2$), $P(M\ge m)\le\alpha_0/2$ | .00435 |
| 28 | .00016 | .99982 | .00103 |
| 29 | .00002 | .99998 | .00018 |
| m=k=30 | 0 | 1.0 | .0002 |

FIG. 5
(PRIOR ART)

DETECTION OF RANDOMNESS IN SPARSE DATA SET OF THREE DIMENSIONAL TIME SERIES DISTRIBUTIONS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The invention generally relates to signal processing/data processing systems for processing time series distributions containing a small number of data points (e.g., less than about ten (10) to twenty-five (25) data points). More particularly, the invention relates to a dual method for classifying the white noise degree (randomness) of a selected signal structure comprising a three dimensional time series distribution composed of a highly sparse data set. As used herein, the term "random" (or "randomness") is defined in terms of a "random process" as measured by the probability distribution model used, namely a nearest-neighbor stochastic (Poisson) process. Thus, pure randomness, pragmatically speaking, is herein considered to be a time series distribution for which no function, mapping or relation can be constituted that provides meaningful insight into the underlying structure of the distribution, but which at the same time is not chaos.

(2) Description of the Prior Art

Recent research has revealed a critical need for highly sparse data set time distribution analysis methods and apparatus separate and apart from those adapted for treating large sample distributions. This is particularly the case in applications such as naval sonar systems, which require that input time series signal distributions be classified according to their structure, i.e., periodic, transient, random or chaotic. It is well known that large sample methods often fail when applied to small sample distributions, but that the same is not necessarily true for small sample methods applied to large data sets. Very small data set distributions may be defined as those with less than about ten (10) to twenty-five (25) measurement (data) points. Such data sets can be analyzed mathematically with certain nonparametric discrete probability distributions, as opposed to large-sample methods, which normally employ continuous probability distributions (such as the Gaussian).

The probability theory discussed herein and utilized by the present invention is well known. It may be found, for example, in works such as P. J. Hoel et al., *Introduction to the Theory of Probability*, Houghton-Mifflin, Boston, Mass., 1971, which is hereby incorporated herein by reference.

Also, as will appear more fully below, it has been found to be important to treat white noise signals themselves as the time series signal distribution to be analyzed, and to identify the characteristics of that distribution separately. This aids in the detection and appropriate processing of received signals in numerous data acquisition contexts, not the least of which include naval sonar applications. Accordingly, it will be understood that prior analysis methods and apparatus analyze received time series data distributions from the point of view of attempting to find patterns or some other type of correlated data therein. Once such a pattern or correlation is located, the remainder of the distribution is simply discarded as being noise. It is believed that the present invention will be useful in enhancing the sensitivity of present analysis methods, as well as being useful on its own.

Various aspects related to the present invention are discussed in the following exemplary patents:

U.S. Pat. No. 6,068,659, issued May 30, 2000, to Francis J. O'Brien, Jr., discloses a method for measuring and recording the relative degree of pical density, congestion, or crowding of objects dispersed in a three-dimensional space. A Population Density Index is obtained for the actual conditions of the objects within the space as determined from measurements taken of the objects. The Population Density Index is compared with values considered as minimum and maximum bounds, respectively, for the Population Density Index values. The objects within the space are then repositioned to optimize the Population Density Index, thus optimizing the layout of objects within the space.

U.S. Pat. No. 5,506,817, issued Apr. 9, 1996, to Francis J. O'Brien, Jr., discloses an adaptive statistical filter system for receiving a data stream comprising a series of data values from a sensor associated with successive points in time. Each data value includes a data component representative of the motion of a target and a noise component, with the noise components of data values associated with proximate points in time being correlated. The adaptive statistical filter system includes a prewhitener, a plurality of statistical filters of different orders, stochastic decorrelator and a selector. The prewhitener generates a corrected data stream comprising corrected data values, each including a data component and a time-correlated noise component. The plural statistical filters receive the corrected data stream and generate coefficient values to fit the corrected data stream to a polynomial of corresponding order and fit values representative of the degree of fit of corrected data stream to the polynomial. The stochastic decorrelator uses a spatial Poisson process statistical significance test to determine whether the fit values are correlated. If the test indicates the fit values are not randomly distributed, it generates decorrelated fit values using an autoregressive moving average methodology which assesses the noise components of the statistical filter. The selector receives the decorrelated fit values and coefficient values from the plural statistical filters and selects coefficient values from one of the filters in response to the decorrelated fit values. The coefficient values are coupled to a target motion analysis module which determines position and velocity of a target.

U.S. Pat. No. 6,466,516 B1, issued Oct., 15, 2002, to O'Brien, Jr. et al., discloses a method and apparatus for automatically characterizing the spatial arrangement among the data points of a three-dimensional time series distribution in a data processing system wherein the classification of said time series distribution is required. The method and apparatus utilize grids in Cartesian coordinates to determine (1) the number of cubes in the grids containing at least one input data point of the time series distribution; (2) the expected number of cubes which would contain at least one data point in a random distribution in said grids; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom within what probability, prior to its output from the invention to the remainder of the data processing system for further analysis.

U.S. Pat. No. 6,397,234 B1, issued May 28, 2002, to O'Brien, Jr. et al., discloses a method and apparatus for automatically characterizing the spatial arrangement among the data points of a time series distribution in a data processing system wherein the classification of this time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom.

U.S. Pat. No. 6,597,634 B1, issued Jul. 22, 2003, to O'Brien, Jr. et al., discloses a signal processing system to processes a digital signal converted from to an analog signal, which includes a noise component and possibly also an information component comprising small samples representing four mutually orthogonal items of measurement information representable as a sample point in a symbolic Cartesian four-dimensional spatial reference system. An information processing sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The information processing system is illustrated as combat control equipment for undersea warfare, which utilizes a sonar signal produced by a towed linear transducer array, and whose mode operation employs four mutually orthogonal items of measurement information.

The above prior art does not disclose a method which utilizes more than one statistical test for characterizing the spatial arrangement among the data points of a three dimensional time series distribution of sparse data in order to maximize the likelihood of a correct decision in processing batches of the sparse data in real time operating submarine systems and/or other contemplated uses.

SUMMARY OF THE INVENTION

Accordingly, it is an object of the invention to provide a dual method comprising automated measurement of the three dimensional spatial arrangement among a very small number of points, objects, measurements or the like whereby an ascertainment of the noise degree (i.e., randomness) of the time series distribution may be made.

It also is an object of the invention to provide a dual method and apparatus useful in naval sonar, radar and lidar and in aircraft and missile tracking systems, which require acquired signal distributions to be classified according to their structure (i.e., periodic, transient, random, or chaotic) in the processing and use of those acquired signal distributions as indications of how and from where they were originally generated.

Further, it is an object of the invention to provide a dual method and apparatus capable of labeling a three dimensional time series distribution with (1) an indication as to whether or not it is random in structure, and (2) an indication as to whether or not it is random within a probability of false alarm of a specific randomness calculation.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a two-stage method for characterizing a spatial arrangement among data points for each of a plurality of three-dimensional time series distributions comprising a sparse number of the data points. The method may comprise one or more steps such as, for instance, creating a first virtual volume containing a first three-dimensional time series distribution of the data points to be characterized and then subdividing the first virtual volume into a plurality k of three-dimensional volumes such that each of the plurality k of three-dimensional volumes have the same shape and size.

A first stage characterization of the spatial arrangement of the first three-dimensional time series distribution of the data points may comprise the steps of determining a statistically expected proportion $\Theta$ of the plurality k of three-dimensional volumes containing at least one of the data points for a random distribution of the data points such that $k^*\Theta$ is a statistically expected number M of the plurality k of three-dimensional volumes which contain at least one of the data points if the first three-dimensional time series distribution is characterized as random. Other steps may comprise counting a number m of the plurality k of three-dimensional volumes which actually contain at least one of the data points in the first three-dimensional time series distribution in any particular sample. The method comprises statistically determining an upper random boundary greater than M and a lower random boundary less than M such that if the number m is between the upper random boundary and the lower random boundary then the first time series distribution is characterized as random in structure during the first stage characterization.

A second stage characterization of the first three-dimensional time series distribution of the data points may comprise the steps of determining when $\Theta$ is less than a pre-selected value, and then utilizing a Poisson distribution to determine a mean of the data points. If $\Theta$ is greater than the pre-selected value, then the method may comprise utilizing a binomial distribution to determine a mean of the data points. Additional steps may comprise computing a probability p from the mean so determined based on whether $\Theta$ is greater than or less than the pre-selected value. Other steps may comprise determining a false alarm probability $\alpha$ based on a total number of the plurality k of three-dimensional volumes for the first three-dimensional time series distribution of the data points to be characterized. The method may comprise comparing p with $\alpha$ to determine whether to characterize the sparse data as noise or signal during the second stage characterization.

The first stage characterization of the first three-dimensional time series distribution of the data points is compared with the second stage characterization of the first three-dimensional time series distribution of the data points to improve the overall accuracy of the characterization.

If the first stage characterization of the first three-dimensional time series distribution of the data points indicates a random distribution and the second stage characterization of the first three-dimensional time series distribution of the data points indicates a signal, then the method may comprise continuing to process the data points.

If the first stage characterization of the first three-dimensional time series distribution of the data points indicates a random distribution and the second stage characterization of the first three-dimensional time series distribution of the data points indicates a random distribution, then the first three-dimensional time series distribution of the data points as random with a higher confidence level than in a single stage characterization.

The method may continue for characterizing each of the plurality of three-dimensional time series distribution of data points.

In a preferred embodiment, the random process (white noise) detection subsystem includes an input for receiving a three-dimensional time series distribution of data points expressed in Cartesian coordinates. This set of data points will be characterized by no more than a maximum number of points having values (amplitudes) between maximum and minimum values received within a preselected time interval. A hypothetical representation of a white noise time series signal distribution in Cartesian space is illustratively shown in FIG. 1. The invention is specifically adapted to analyze both selected portions of such time series distributions, and the entirety of the distribution depending upon the sensitivity of the randomness determination, which is required in any particular instance.

The input time series distribution of data points is received by a display/operating system adapted to accommodate a pre-selected number of data points N in a pre-selected time interval $\Delta t$ and dispersed in three-dimensional space along with a first measure referred to as Y with magnitude $\Delta Y=\max(Y)-\min(Y)$, and a second measure referred to as Z with magnitude $\Delta Z=\max(Z)-\min(Z)$. The display/operating system then creates a virtual volume around the input data distribution and divides the virtual volume into a grid consisting of cubic cells each of equal enclosed volume. Ideally, the cells fill the entire virtual volume, but if they do not, the unfilled portion of the virtual volume is disregarded in the randomness determination.

An analysis device then examines each cell to determine whether or not one or more of the data points of the input time series distribution are located therein. Thereafter, a counter calculates the number of occupied cells. Also, the number of cells which would be expected to be occupied in the grid for a totally random distribution is predicted by a computer device according to known Poisson probability process theory and binomial Theorem equations. In addition, the statistical bounds of the predicted value are calculated based upon known discrete binomial criteria.

A comparator is then used to determine whether or not the actual number of occupied cells in the input time series distribution is the same as the predicted number of cells for a random distribution. If it is, the input time series distribution is characterized as random. If it is not, the input time series distribution is characterized as nonrandom.

Thereafter, the characterized time series distribution is labeled as random or nonrandom, and/or as random or nonrandom within a pre-selected probability rate of the expected randomness value prior to being output back to the remainder of the data processing system. In the naval sonar signal processing context, this output either alone, or in combination with overlapping similarly characterized time series signal distributions, will be used to determine whether or not a particular group of signals is white noise. If that group of signals is white noise, it commonly will be deleted from further data processing. Hence, it is contemplated that the present invention, which is not distribution dependent in its analysis as most prior art methods of signal analysis are, will be useful as a filter or otherwise in conjunction with current data processing methods and equipment.

In the above regards, it should be understood that the statistical bounds of the predicted number of occupied cells in a random distribution (including cells occupied by mere chance) mentioned above may be determined by a second calculator device using a so-called probability of false alarm rate. In this case, the actual number of occupied cells is compared with the number of cells falling within the statistical boundaries of the predicted number of occupied cells for a random distribution in making the randomness determination. This alternative embodiment of the invention has been found to increase the probability of being correct in making a randomness determination for any particular time series distribution of data points by as much as 60%.

The above and other novel features and advantages of the invention, including various novel details of construction and combination of parts will now be more particularly described with reference to the accompanying drawings and pointed out by the claims. It will be understood that the particular device and method embodying the invention is shown and described herein by way of illustration only, and not as limitations on the invention. The principles and features of the invention may be employed in numerous embodiments without departing from the scope of the invention in its broadest aspects.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein:

FIG. 5 is a table showing an illustrative set of discrete binomial probabilities for the randomness of each possible number of occupied cells of a particular time series distribution within a specific probability of false alarm rate of the expected randomness number in accordance with prior art.

DESCRIPTION OF THE PREFERRED EMBODIMENT

Figure 1:
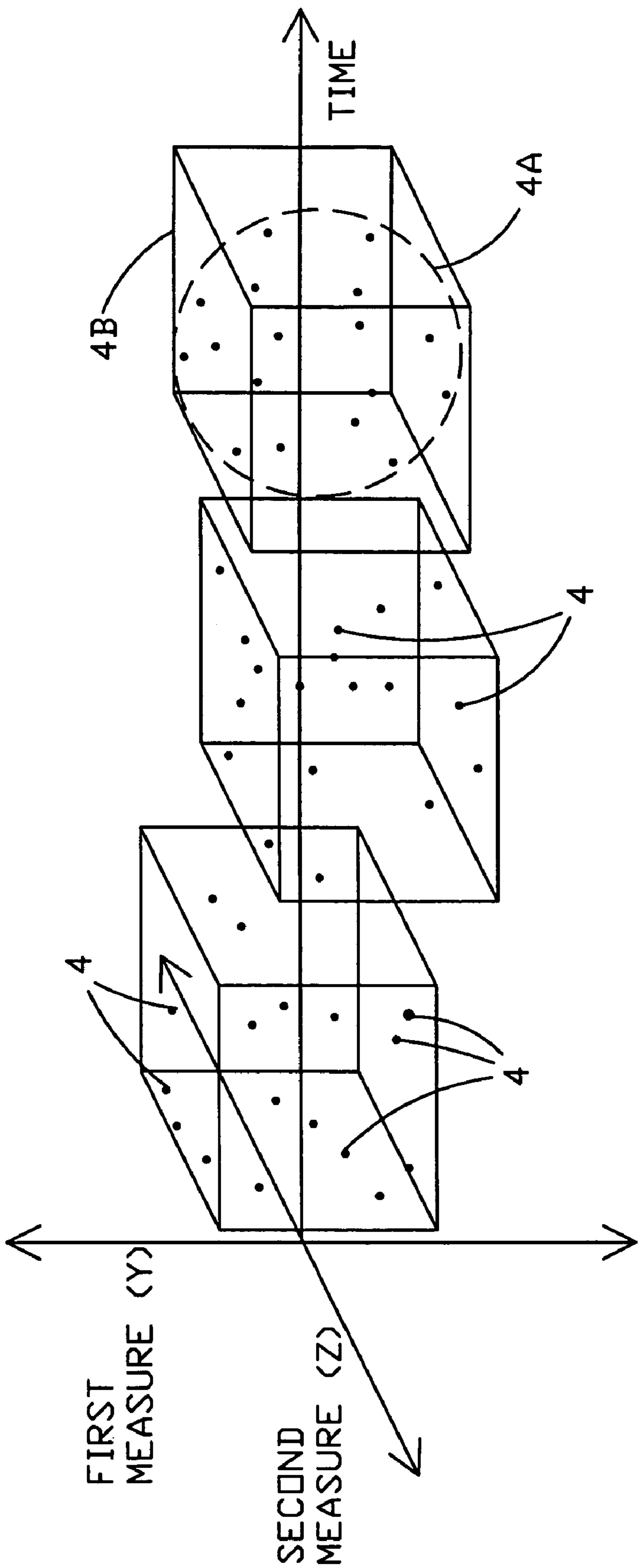
FIG. 1 is a hypothetical depiction in Cartesian coordinates of a representative white noise (random) time series signal distribution in accordance with prior art.

Referring now to the drawings, a preferred embodiment of the dual method of the invention will be presented first from a theoretical perspective, and thereafter, in terms of a specific example. In this regard, it is to be understood that all data points are herein assumed to be expressed and operated upon by the various apparatus components in a Cartesian coordinate system. Accordingly, all measurement, signal and other data input existing in terms of other coordinate systems is assumed to have been re-expressed in a Cartesian coordinate system prior to its input into the inventive apparatus or the application of the inventive method thereto.

The invention starts from the preset capability of a display/operating system 8 (FIG. 4) to accommodate a set number of data points N in a given time interval $\Delta t$. The data points are dispersed in three-dimensional space with a first measure referred to as Y with magnitude $\Delta Y=\max(Y)-\min(Y)$, and a second measure referred to as Z with magnitude $\Delta Z=\max(Z)-\min(Z)$. A representation of a three-dimensional time series distribution of random data points 4 is shown in FIG. 1. A subset 4*a* of this overall time series data distribution would normally be selected for analysis of its signal component distribution by this invention.

For purposes of mathematical analysis of the signal components, it is assumed that the product/quantity given by Δt*ΔY*ΔZ=[max(t)−min(t)]*[max Y−min(Y)]*[max(Z) −min(Z)] will define the virtual volume 4*b*, illustrated as containing the subset 4*a*, with respect to the quantities in the analysis subsystem. The sides of virtual volume are drawn parallel to the time axis and other axes as shown. Then, for substantially the total volume of the display region, a Cartesian partition is superimposed on the region with each partition being a small cube of sides δ (see, FIG. 2). The measure of 8 will be defined herein as:

$$\delta = \left(\frac{\Delta t * \Delta Y * \Delta Z}{k}\right)^{\frac{1}{3}} \tag{1}$$

The quantity k represents the total number of small cubes of volume $\delta^3$ created in the volume Δt*ΔY*ΔZ. Other than full cubes 6 are ignored in the analysis. The quantity of such cubes with which it is desired populate the display region is determined using the following relationship, wherein N is the maximum number of data points in the time series distribution, Δt, ΔY and ΔZ are the Cartesian axis lengths, and the side lengths of each of the cubes is δ:

$$k_I = int\left(\frac{\Delta t}{\delta_I}\right) * int\left(\frac{\Delta Y}{\delta_I}\right) * int\left(\frac{\Delta Z}{\delta_I}\right), \tag{2}$$

where int is the integer operator, $$\delta_i = \sqrt[3]{\frac{\Delta t * \Delta Y * \Delta Z}{k_0}}, \text{ and}$$

$$k_0 = \begin{cases} k_1 \text{ if } |N - k_1| \le |N - k_2| \\ k_2 \text{ otherwise} \end{cases}$$

where $$k_1 = \left[\text{int}\left(N^{\frac{1}{3}}\right)\right]^3$$

$$k_2 = \left[\text{int}\left(N^{\frac{1}{3}}\right) + 1\right]^3;$$

$$k_{II} = \text{int}\left(\frac{\Delta t}{\delta_{II}}\right) * \text{int}\left(\frac{\Delta Y}{\delta_{II}}\right) * \text{int}\left(\frac{\Delta Z}{\delta_{II}}\right) \tag{3}$$

where $$\delta_{II} = \sqrt[3]{\frac{\Delta t * \Delta Y * \Delta Z}{N}}, \tag{4}$$

$$\therefore k = \begin{cases} k_I \text{ if } K_1 > K_{II} \\ k_{II} \text{ if } K_I < K_{II} \\ \max(k_I, k_{II}) \text{ if } K_I = K_{II} \end{cases}$$

where $$K_I = \frac{k_I}{\Delta t * \Delta Y * \Delta Z}\delta_I^3 \le 1 \text{ and}$$

$$K_{II} = \frac{k_{II}}{\Delta t * \Delta Y * \Delta Z}\delta_{II}^3 \le 1.$$

It is to be noted that in cases with very small amplitudes, it may occur that int $(\Delta Y/\delta_I) \leqq 1$, int $(\Delta Y/\delta_{II}) \leqq 1$, int $(\Delta Z/\delta_I) \leqq 1$, or int$(\Delta Y/\delta_{II}) \leqq 1$. In such cases, the solution is to round off either quantity to the next highest value (i.e., ≧2). This weakens the theoretical approach, but it allows for practical measurements to be made.

As an example of determining k, assume Δt (or N)=30, ΔY=20 and ΔZ=9, then k=30 (from equations (2) through (4)) and δ=5.65 (from equation (1)). In essence, therefore, the above relation defining the value k selects the number of cubes having sides of length δ and volume $\delta^3$, which fill up the total space Δt*ΔY*ΔZ to the greatest extent possible, i.e., $k*\delta^3 \approx \Delta t*\Delta Y*\Delta Z$.

From the selected partitioning parameter k, the region (volume) Δt*ΔY*ΔZ is carved up into k cubes, with the sides of each cube being δ as defined above. In other words, the horizontal (or time) axis is marked off into intervals, exactly int(Δt/δ) of them, so that the time axis has the following arithmetic sequence of cuts (assuming that the time clock starts at Δt=0):

0, δ, 2δ, . . . , int(Δt/δ)*δ

Likewise, the vertical (or first measurement) axis is cut up into intervals, exactly int(ΔY/δ) of them, so that the vertical axis has the following arithmetic sequence of cuts:

$$\min(Y), \min(Y)+\delta, \ldots, \min(Y)+int(\Delta Y\delta)*\delta=\max(Y),$$

where min is the minimum operator and max is the maximum operator.

Similarly, the horizontal plane (or second measurement) axis is cut up into intervals, exactly int(ΔZ/δ) of them, so that this horizontal plane axis has the following arithmetic sequence of cuts:

$$\min(Z), \min(Z)+\delta, \ldots, \min(Z)+int(\Delta Z/\delta)*\delta=\max(Z)$$

Based on the Poisson point process theory for a measurement set of data in a time interval Δt of measurements of magnitudes ΔY and ΔZ, that data set is considered to be purely random (or "white noise") if the number of partitions k are nonempty (i.e., contain at least one data point of the time series distribution thereof under analysis) to a specified degree. The expected number of nonempty partitions in a random distribution is given by the relationship:

$$k*\Theta=k*(1-e^{-N/k}) \tag{5}$$

where the quantity Θ is the expected proportion of nonempty partitions in a random distribution and N/k is "the parameter of the spatial Poisson process" corresponding to the average number of points observed across all three-dimensional subspace partitions.

The boundary, above and below k*Θ, attributable to random variation and controlled by a false alarm rate is the so-called "critical region" of the test. The quantity Θ not only represents (a) the expected proportion of nonempty cubic partitions in a random distribution, but also (b) the probability that one or more of the k cubic partitions is occupied by pure chance, as is well known to those in the art. The boundaries of the parameter k*Θ comprising random process are determined in the following way.

Figure 2:
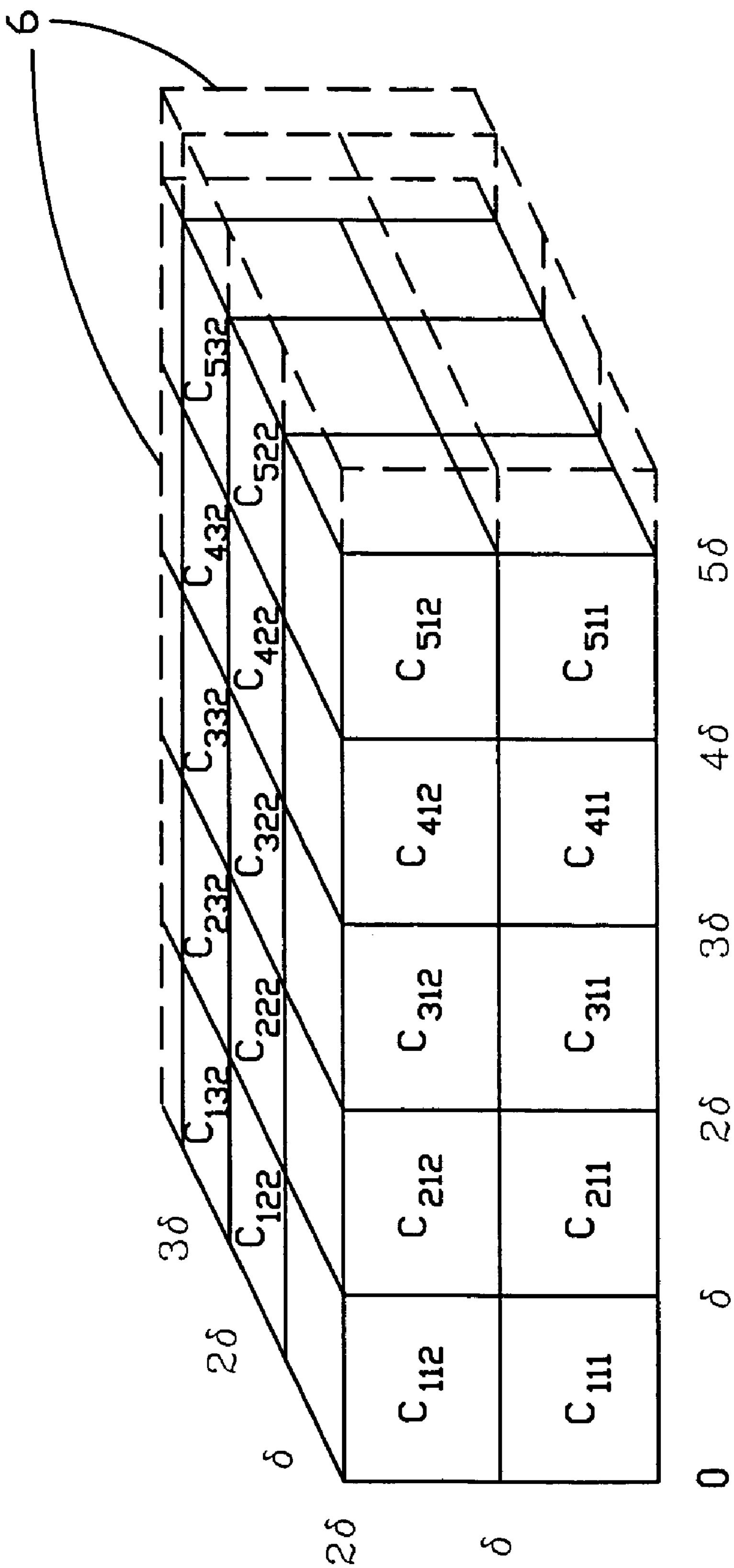
FIG. 2 is a hypothetical illustrative representation of a virtual volume in accordance with prior art divided into a grid of cubic cells each having a side of length $\delta$, and an area of $\delta^3$.

Let M be a random variable representing the integer number of occupied cubic partitions as illustratively shown in FIG. 2. Let m be an integer (sample) representation of M. Let $m_1$ be the quantity forming the lower random boundary of the statistic $k^*\Theta$ given by the binomial criterion:

$$P(M \leq m) \leq \frac{\alpha_0}{2}, \min\left(\frac{\alpha}{2} - \frac{\alpha_0}{2}\right) \tag{6}$$

where;

$$P(M \leq m) = \sum_{m=0}^{m_1} B(m; k, \Theta).$$

B(m;k,Θ) is the binomial probability function given as:

$$B(m; k, \Theta) = \binom{k}{m}(\Theta)^m(1-\Theta)^{k-m}$$

where $$\binom{k}{m}$$

is the binomial coefficient, $$\binom{k}{m} = \frac{k!}{m!(k-m)!}, \text{ and} \tag{6A}$$

$$\sum_{m=0}^{m=k} B(m; k, \Theta) = 1.0.$$

The quantity $\alpha_o$ is the probability of coming closest to an exact value of the pre-specified false alarm probability $\alpha$, and $m_1$ is the largest value of m such that $P(M \leqq m) \leqq \alpha_0/2$. It is an objective of this method to minimize the difference between $\alpha$ and $\alpha_0$. The recommended probability of false alarm (PFA) values for differing values of spatial subsets k, and based on commonly accepted levels of statistical precision, are as follows:

| PFA(α) | k |
|---|---|
| 0.01 | k ≧ 25 |
| 0.05 | k < 25 |

The upper boundary of the random process is called $m_2$, and is determined in a manner similar to the determination of $m_1$.

Thus, let $m_2$ be the upper random boundary of the statistic $k^*\Theta$) given by:

$$P(M \geq m) \leq \frac{\alpha_0}{2}, \min\left(\frac{\alpha}{2} - \frac{\alpha_0}{2}\right) \tag{7}$$

where

-continued $$P(M \geq m) = \sum_{m=m_2}^{k} B(m; k, \Theta) \leq \alpha_0/2$$

or $$P(M \geq m) = 1 - \sum_{m=0}^{m_2-1} B(m; k, \Theta) \leq \alpha_0/2.$$

The value $\alpha_o$ is the probability coming closest to an exact value of the pre-specified false alarm probability $\alpha$, and $M_2$ is the largest value of m such that $P(M \geqq m) \leqq \alpha_0/2$. It is an objective of the invention to minimize the difference between $\alpha$ and $\alpha_o$.

Hence, the subsystem determines if the signal structure contains m points within the "critical region" warranting a determination of "non-random", or else "random" is the determination, with associated PFA of being wrong in the decision when "random" is the decision.

The subsystem also assesses the random process hypothesis by testing:

$$H_0: \hat{P} = \Theta(\text{NOISE})$$

$$H_1: \hat{P} \neq \Theta(\text{SIGNAL+NOISE}),$$

where $\hat{P}=m/k$ is the sample proportion of signal points contained in the k sub-region partitions of the space $\Delta t^*\Delta Y^*\Delta Z$ observed in a given time series. As noted above, FIG. 1 shows what a hypothetical white noise (random) distribution looks like in Cartesian time-space.

Thus, if $\Theta \approx \hat{P} = m/k$, the observed distribution conforms to a random distribution corresponding to "white noise".

The estimate for the proportion of k cells occupied by N measurements ($\hat{P}$) is developed in the following manner. Let each of the k cubes with sides of length $\delta$ be denoted by $C_{hij}$, and the number of objects observed in each $C_{hij}$ cube be denoted card($C_{hij}$) where card means "cardinality" or subset count. $C_{hij}$ is labeled in an appropriate manner to identify each and every cube in the three space. Using the example given previously with $N=\Delta t=30$, $\Delta Y=20$, $\Delta Z=9$ and $k=30=5^*3^*2$, the cubes may be labeled using the index h running from 1 to 5, the index i running from 1 to 3 and the index j running from 1 to 2 (see FIG. 2).

Next, to continue the example for k=30 shown in FIG. 2, define the following cube counting scoring scheme for the 5*3*2 partitioning comprising whole cube subsets:

$$X_{hij} = \begin{cases} 1 \text{ if } \operatorname{card}(C_{hij}) > 0;\ h = 1 \text{ to } 5,\ i = 1 \text{ to } 3,\ j = 1 \text{ to } 2 \\ 0 \text{ if } \operatorname{card}(C_{hij}) = 0;\ h = 1 \text{ to } 5,\ i = 1 \text{ to } 3,\ j = 1 \text{ to } 2 \end{cases}.$$

Thus, $X_{hij}$ is a dichotomous variable taking on the individual values of 1 if a cube $C_{hij}$ has one or more objects present, and a value of 0 if the cube is empty.

Then calculate the proportion of 30 cells occupied in the partition region:

$$\hat{P} = \frac{1}{30}\sum_{j=1}^{2}\sum_{i=1}^{3}\sum_{h=1}^{5} X_{hij}.$$

The generalization of this example to any sized table is obvious and within the scope of the present invention. For the general case, it will be appreciated that, for the statistics $X_{hij}$ and $C_{hij}$, the index h runs from 1 to int(Δt/δ), the index i runs from 1 to int(ΔY/δ) and the index j runs from 1 to int(ΔZ/δ).

In addition, a conjoint, confirmatory measure useful in the interpretation of outcomes is the R ratio, defined as the ratio of observed to expected occupancy rates:

$$R = \frac{m}{k * \Theta} = \frac{\hat{P}}{\Theta} \tag{8}$$

The range of values for R indicate:

R<1, clustered distribution

R=1, random distribution; and

R>1, uniform distribution.

The R statistic is used in conjunction with the formulation just described involving the binomial probability distribution and false alarm rate in deciding to accept or reject the "white noise" hypothesis. Its use is particularly warranted in very small samples (N<25). In actuality, R may never have a precise value of 1. Therefore, a new novel method is employed for determining randomness based on the R statistic of equation (8).

A rigorous statistical procedure has been developed to determine whether the observed R-value is indicative of "noise" or "signal". The procedure renders quantitatively the interpretations of the R-value whereas the prior art has relied primarily on intuitive interpretation or ad hoc methods, which can be erroneous.

In this formulation, one of two statistical assessment tests is utilized depending on the value of the parameter Θ.

If Θ≦0.10, then a Poisson distribution is employed. To apply the Poisson test, the distribution of the N sample points is observed in the partitioned space. It will be appreciated that a data sweep across all cells within the space will detect some of the squares being empty, some containing k=1 points, k= 2 points, k=3 points, and so on. The number of points in each k category is tabulated in a table such as follows:

Frequency Table of Cell Counts

| k (number of cells with points) | $N_k$ (number of points in k cells) |
|---|---|
| 0 | $N_0$ |
| 1 | $N_1$ |
| 2 | $N_2$ |
| 3 | $N_3$ |
| . | . |
| . | . |
| . | . |
| K | $N_k$ |

From this frequency table, two statistics are of interests for the Central Limit Theorem approximation:

The "total", $$Y = \sum_{k=0}^{K} kN_k,$$

and (9)

the sample mean, $$\mu_0 = \frac{\sum_{k=0}^{K} kN_k}{\sum_{k=0}^{K} N_k}.$$

Then, if Θ≦0.10, the following binary hypothesis is of interest:

$$H_0: \mu = \mu_0 \text{(NOISE)}$$

$$H_1: \mu \neq \mu_0 \text{(SIGNAL)}$$

The Poisson test statistic, derived from the Central Limit Theorem, Eq. (9) is as follows:

$$Z_P = \frac{Y - N\mu_0}{\sqrt{N\mu_0}}, \ (k > 25) \text{ where } Y = \sum_{k=0}^{K} kN_k, \tag{11}$$

and N is the sample size. Then $$\mu_0 = \frac{\sum_{k=0}^{K} kN_k}{\sum_{k=0}^{K} N_k}$$

is the sample mean and sample variance. (It is well known that $\mu=\sigma^2$ in a Poisson distribution).

The operator compares the value of $Z_p$ against a probability of False Alarm α. α is the probability that the null hypothesis (NOISE) is rejected when the alternative (SIGNAL) is the truth.

The probability of the observed value $Z_p$ is calculated as:

$$p = P(|z_p| \le Z) = 1 - \frac{1}{\sqrt{2\pi}} \int_{-|z_p|}^{+|z_p|} \exp(-.5x^2)\,dx \tag{12}$$

where |x| means "absolute value" as commonly used in mathematics.

The calculation of Eq. 12 as known to those skilled in the art, is performed in a standard finite series expansion.

On the other hand, if Θ>0.10, the invention dictates that the following binary hypothesis set prevail:

$$H_0: \mu = k\theta \text{(NOISE)}$$

$$H_1: \mu = k\theta \text{(SIGNAL)}$$

The following binomial test statistic is employed to test the hypothesis:

$$Z_B = \frac{m \pm c - k\theta}{\sqrt{k\theta(1-\theta)}}$$

where c=0.5 if $X<\mu$ and c=−0.5 is $X>\mu$ (Yates Continuity correction factor used for discrete variables) The quantities of $Z_B$ have been defined previously.

The probability of the observed value $Z_B$ is calculated as $$p = P(|z_B| \le Z) = 1 - \frac{1}{\sqrt{2\pi}}\int_{-|z_B|}^{+|z_B|}\exp(-.5x^2)\,dx$$

in a standard series expansion.

For either test statistic, $Z_p$ or $Z_B$, the following decision rule is used to compare the false alarm rate α with the observed probability of the statistic, p:

$$\text{if } p \geqq \alpha \Rightarrow \text{NOISE}$$

$$\text{If } p < \alpha \Rightarrow \text{SIGNAL}$$

Thus, if the calculated probability value p>α, then the three-dimensional spatial distribution is deemed "noise"; otherwise the X-Y-Z data is characterized as "signal" by the Rtest.

EXAMPLE

Figure 3:
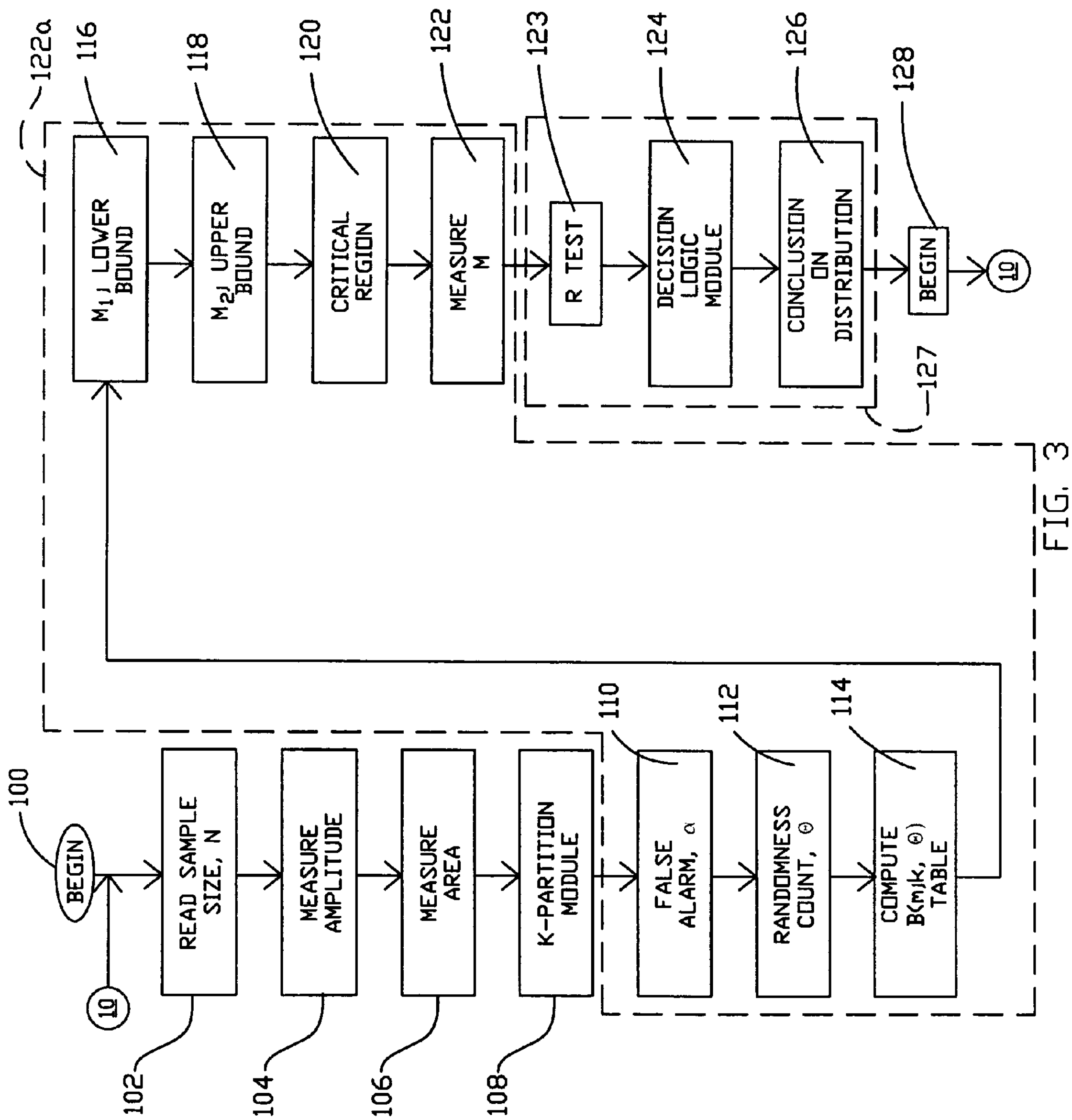
FIG. 3 is a block diagram representatively illustrating the method steps of the invention.
Figure 4:
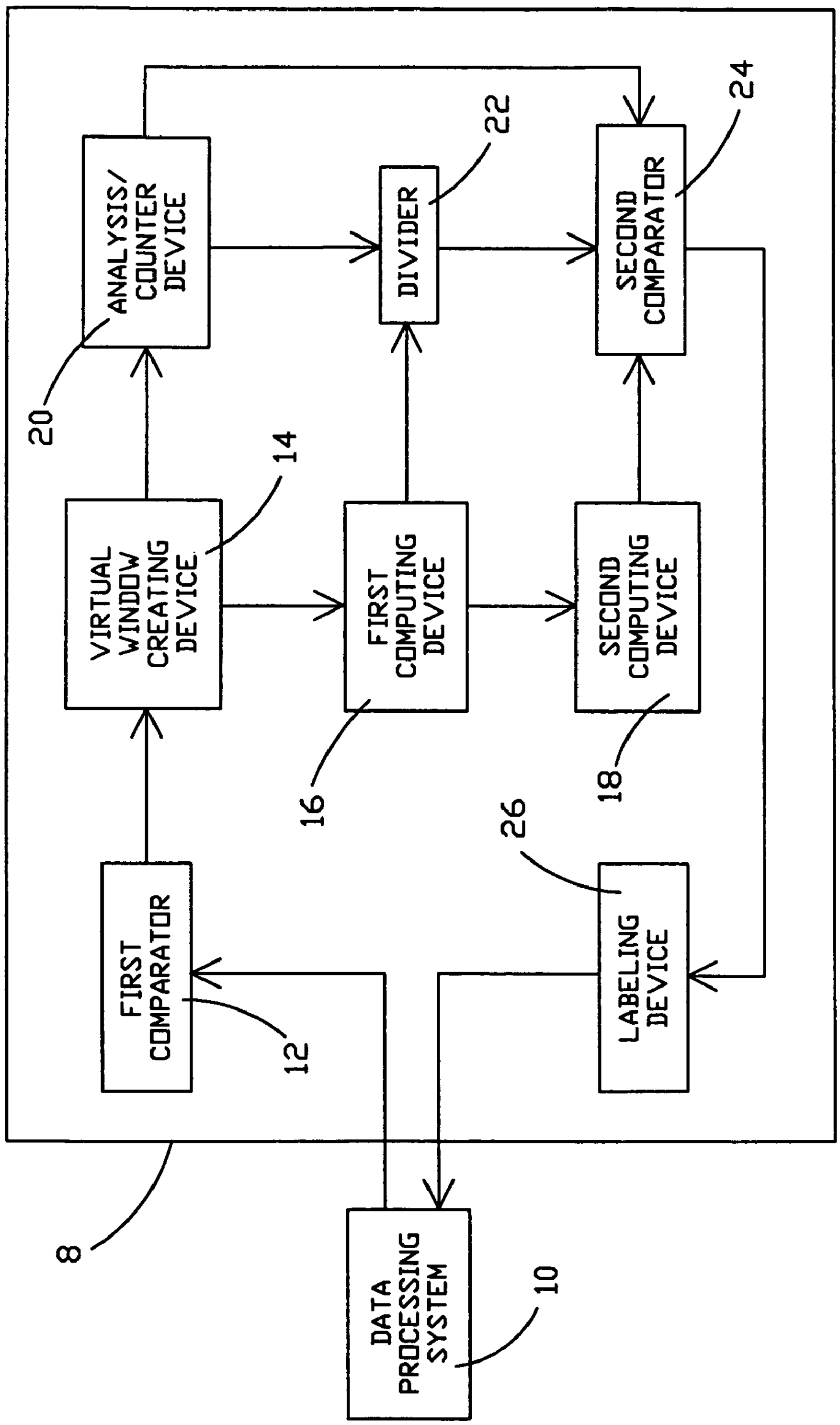
FIG. 4 is a block diagram representatively illustrating an apparatus in accordance with prior art.

Having thus explained the theory of the invention, an example thereof will now be presented for purposes of further illustration and understanding (see, FIGS. 3 and 4). A value for N is first selected, here N=30 (step 100, FIG. 3). A time series distribution of data points is then read into a display/operating subsystem 8 adapted to accommodate a data set of size N from data processing system 10 (step 102). Thereafter, the absolute value of the difference between the largest and the smallest data points for each measure, ΔY and, is determined by a first comparator device 12 (step 104). In this example, it will be assumed that N=Δt=30 measurements with a measured amplitudes of ΔY=20 units and ΔZ=9 units. The N, ΔY and ΔZ values are then used by window creating device 14 to create a virtual volume in the display/operating system enclosing the input time series distribution, the size of the volume so created being Δt*ΔY*ΔZ=5400 units (step 106).

Thereafter, as described above, the virtual volume is divided by the cube creating device 14 into a plurality k of cubes $C_{hij}$ (see FIG. 4), each cube having the same geometric shape and enclosing an equal volume so as to substantially fill the virtual volume containing the input time series distribution set of data points (step 108). The value of k is established by the relation given in equations (2) through (4):

$$k = int\left(\frac{\Delta t}{\delta}\right) * int\left(\frac{\Delta Y}{\delta}\right) * int\left(\frac{\Delta Z}{\delta}\right) = 5*3*2 = 30$$

$$\delta = \sqrt[3]{\frac{\Delta t * \Delta Y * \Delta Z}{k}} = 5.65.$$

Thus, the 5400 unit$^3$ space of the virtual volume is partitioned into 30 cubes of side 5.65 so that the whole space is filled (k*δ$^3$5400). The time-axis arithmetic sequence of cuts are: 0, 5.65, . . . , int(Δt/δ) δ=28.2. The Y amplitude axis cuts are: min(Y), min(Y)+δ, . . . , min(Y)+int(ΔY/δ)*δ= max(Y) and the Z amplitude axis cuts are: min(Z), min(Z) +δ, . . . , min(Z)+int (ΔZ/δ)*δ=max(Z).

Next, the probability false alarm rate is set at step 110 according to the value of k as discussed above. More particularly, in this case α=0.01, and the probability of a false alarm within the critical region is α/2=0.005.

The randomness count is then calculated by first computing device 16 at step 112 according to the relation of equation (5):

$$k*\Theta = k*(1-e^{-N/k}) = 30*0.632 \cong 18.96.$$

Therefore, the number of cubes expected to be non-empty in this example, if the input time series distribution is random, is about 19.

The binomial distribution discussed above is then calculated by a second computing device 18 according to the relationships discussed above (step 114, FIG. 3). Representative values for this distribution are shown in FIG. 5 for each number of possible occupied cells m for k=30 and Θ=0.632.

The upper and lower randomness boundaries then are determined, also by second calculating device 18. Specifically, the lower boundary is calculated from FIG. 5 (step 116) from the criterion $P(M \leqq m) \leqq \alpha_0/2$. Then, computing the binomial probabilities results in $P(M \leqq 11)=0.00265$. Thus, the lower bound is $m_1=11$.

The upper boundary, on the other hand, is the randomness boundary $M_2$ from the criterion $P(M \geqq m) \leqq \alpha_0/2$. Computing the binomial probabilities gives $P(M \geqq 27)=0.00435$; hence $m_2=27$ is taken as the upper bound (step 118). The probabilities necessary for this calculation also are shown in FIG. 5.

Therefore, the critical region is defined in this example as $m_1 \leqq 11$, and $m_2 \geqq 27$ (step 120).

The actual number of cells containing one or more data points of the time series distribution determined by analysis/counter device 20 (step 122, FIG. 3) is then used by divider 22 and a second comparator 24 in the determination of the randomness of the distribution (step 124, FIG. 3). Specifically, using m=18 as an example, it will be seen that the sample statistic $\hat{P}=m/k=0.600$, and that $R=\hat{P}/\Theta=0.600/0.632=0.94$.

Steps 110, 112, 114, 116, 118, 120 and 122 comprise the hereinearlier referred to first stage characterization process, hereby designed by the reference character 122*a* (only FIG. 3).

Branching to step 123 (FIG. 3) which the sparse data decision logic module performs, the R statistic value of 0.94 is evaluated statistically. A more precise indicator is obtained by applying the significance test in accord with the present invention, as described earlier. For this calculation, we note that θ=0.632, which invokes the Binomial probability model to test the hypothesis:

$$H_0: \mu = k\theta \text{(NOISE)}$$

$$H_1: \mu = k\theta \text{(SIGNAL)}$$

In this case, kθ=18.96. Thus, applying the Binomial test gives:

$$Z_B = \frac{m \pm c - k\theta}{\sqrt{k\theta(1-\theta)}} = \frac{18 - .5 - 18.96}{\sqrt{30(.632)(1 - .632)}} \approx -.55$$

The p value is computed to be:

$$p = P(|z_B| \leq Z) = 1 - \frac{1}{\sqrt{2\pi}} \int_{-|-.43|}^{+|-.43|} \exp(-.5x^2)\,dx = .58$$

Since p=0.58 and α=0.1, and since $p \geqq \alpha$, we conclude (step 124) that the R test shows the volumetric data to be random (NOISE only, with 99% certainty) with the value of R=0.93 computed for this spatial distribution in 3D-space.

It is also worth noting in this regard that the total probability is 0.00265+0.00435=0.00700, which is the probability of being wrong in deciding "random". This value is less than the probability of a false alarm, PFA=0.01. Thus, the actual protection against an incorrect decision is much higher (by about 30%) than the a priori sampling plan specified.

Since m=18 falls inside of the critical region, i.e., $m_1 \leqq 18 \leqq M_2$, the decision is that the data represent an essentially white noise distribution (step 126). Steps 123, 124, and 126 comprise the hereinearlier referred to second stage characterization process, hereby designated by the reference numeral 127 (only FIG. 3). Accordingly, since both methods yield consistent results the distribution is labeled at step 128 by the labeling device 26 as a noise distribution, and transferred back to the data processing system 10 for further processing. In the naval sonar situation having a spatial component, a signal distribution labeled as white noise would be discarded by the processing system, but in some situations a further analysis of the white noise nature of the distribution would be possible. Similarly, the invention is contemplated to be useful as an improvement on systems that look for patterns and correlations among data points. For example, overlapping time series distributions might be analyzed in order to determine where a meaningful signal begins and ends.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A two-stage method for characterizing a spatial arrangement among data points for each of a plurality of three-dimensional time series distributions comprising a sparse number of said data points, said method comprising the steps of:

- creating a first virtual volume containing a first three-dimensional time series distribution of said data points to be characterized;
- subdividing said first virtual volume into a plurality k of three-dimensional volumes, each of said plurality k of three-dimensional volumes having the same shape and size;
- providing a first stage characterization of said spatial arrangement of said first three-dimensional time series distribution of said data points comprising the steps of:
  - determining a statistically expected proportion Θ of said plurality k of three-dimensional volumes containing at least one of said data points for a random distribution of said data points such that k*Θ is a statistically expected number of said plurality k of three-dimensional volumes which contain at least one of said data points if said first three-dimensional time series distribution is characterized as random;
  - counting a number m of said plurality k of three-dimensional volumes which actually contain at least one of said data points in said first three-dimensional time series distribution, wherein M is the symbolic alphabetical character assigned to be the parameter representing k*Θ in mathematical statements and m is a representation of M in a given spatial arrangement undergoing processing in accordance with the method;
  - statistically determining an upper random boundary $m_2$ greater than M and a lower random boundary $m_1$ less than M such that if said number m is between said upper random boundary and said lower random barrier then said first three-dimensional time series distribution is characterized as random in structure during said first stage characterization;
- providing a second stage characterization of said first three-dimensional time series distribution of said data points comprising the steps of:
  - when Θ is less than a pre-selected value, then utilizing a Poisson distribution to determine a first mean of said data points;
  - when Θ is greater than said pre-selected value, then utilizing a binomial distribution to determine a second mean of said data points;
  - computing a probability p from said first mean or from said second mean depending on whether Θ is greater than or less than said pre-selected value;
  - determining a false alarm probability α based on a total number of said plurality k of three-dimensional volumes for said first three-dimensional time series distribution of said data points to be characterized;
  - comparing p with α to determine whether to characterize said sparse number of said data points as noise or signal during said second stage characterization; and
- comparing said first stage characterization of said first three-dimensional time series distribution of said data points with said second stage characterization of said first three-dimensional time series distribution of said data points to determine presence of randomness in said first three-dimensional time series distribution.

2. The two-stage method of claim 1, wherein if said first stage characterization of said first three-dimensional time series distribution of said data points indicates a random distribution and said second stage characterization of said first three-dimensional time series distribution of said data points indicates a signal, then continue to process said data points.

3. The two-stage method of claim 1, wherein if said first stage characterization of said first three-dimensional time series distribution of said data points indicates a random distribution and said second stage characterization of said first three-dimensional time series distribution of said data points indicates a random distribution, then labeling said first three-dimensional time series distribution of said data points as random.

4. The two-stage method of claim 1, further comprising utilizing the method steps of claim 1 for characterizing each of said plurality of three-dimensional time series distributions of said data points.

5. The two-stage method of claim 1, wherein said first three-dimensional time series distribution of said data points comprises less than about twenty-five (25) data points.

6. The two-stage method of claim 1, wherein said upper random boundary greater than M and said lower random barrier less than M are computed utilizing binomial probabilities.

7. The two-stage method of claim 1, further comprising obtaining each of said plurality of three-dimensional time series distributions comprising said sparse number of said data points from a sonar system.

8. The two-stage method of claim 1, further comprising obtaining each of said plurality of three-dimensional time series distributions comprising said sparse number of said data points from a radar system.

9. The two-stage method of claim 1, further comprising determining said false alarm probability α based on a total number of said plurality k of three-dimensional volumes for said first three-dimensional time series distribution of said data points to be characterized wherein:

$$\alpha=0.01 \text{ if } k \geqq 25, \text{ and}$$

$$\alpha=0.05 \text{ if } k<25.$$

10. The two-stage method of claim 1, wherein said step of comparing p with α to determine whether to characterize said sparse number of said data points as noise or signal during said first stage characterization is mathematically stated as:

$$\text{if } p \geqq \alpha \Rightarrow \text{NOISE, and}$$

$$\text{if } p<\alpha \Rightarrow \text{a SIGNAL.}$$

11. The two-stage method of claim 1, wherein said pre-selected value is equal to 0.10 such that if Θ≦0.10, then said Poisson distribution is utilized, and if Θ>0.10, then said binomial distribution is utilized.

12. The two-stage method of claim 1, wherein a total number Y of said data points is given by $$Y=\sum_{k=0}^{K} kN_k,$$

where:

| k (number of cells with points) | $N_k$ (number of points in k cells) |
|---|---|
| 0 | $N_0$ |
| 1 | $N_1$ |
| 2 | $N_2$ |
| 3 | $N_3$ |
| . | . |
| . | . |
| . | . |
| K | $N_K$. |

13. The two-stage method of claim 12, wherein said step of computing said probability p from said first mean further comprises utilizing the following equation:

$$p=P(|z_p| \leq Z)=1-\frac{1}{\sqrt{2\pi}}\int_{-|z_p|}^{+|z_p|}\exp(-.5x^2)\,dx \text{ where}$$

$$Z_P=\frac{Y-N\mu_0}{\sqrt{N\mu_0}}$$

where P refers to probability, where Z is the theoretical Gaussian continuous probability distribution, where X is the "dummy variable" of integration in the integrand, where Y is said total number of data points, where, N is a sample size of said data points for each of a plurality of three-dimensional time series distributions, and $$\mu_0=\frac{\sum_{k=0}^{K} kN_k}{\sum_{k=0}^{K} N_k}$$

is said first mean.

14. The two-stage method according to claim 13, wherein said step of computing said probability p from said second mean further comprises utilizing the following equation:

$$p=P(|z_B| \leq Z)=1-\frac{1}{\sqrt{2\pi}}\int_{-|z_B|}^{+|z_B|}\exp(-.5x^2)\,dx \text{ where}$$

$$Z_B=\frac{m \pm c-k\theta}{\sqrt{k\theta(1-\theta)}}$$

where c is a correction factor.

15. The two-stage method of claim 12, wherein said plurality k of three-dimensional volumes into which said first virtual volume is subdivided is determined from the relation $$k=\begin{cases} k_I \text{ if } K_I>K_{II} \\ k_{II} \text{ if } K_I<K_{II} \\ \max(k_I,k_{II}) \text{ if } K_I=K_{II} \end{cases}, \text{ where}$$

$$k_I=int\left(\frac{\Delta t}{\delta_I}\right)*int\left(\frac{\Delta Y}{\delta_I}\right)*int\left(\frac{\Delta Z}{\delta_I}\right),$$

$$k_{II}=int\left(\frac{\Delta t}{\delta_{II}}\right)*int\left(\frac{\Delta Y}{\delta_{II}}\right)*int\left(\frac{\Delta Z}{\delta_{II}}\right),$$

$$\delta_I=\sqrt[3]{\frac{\Delta t*\Delta Y*\Delta Z}{k_0}},$$

$$k_0=\begin{cases} k_1 \text{ if } |N-k_1| \leq |N-k_2| \\ k_2 \text{ otherwise} \end{cases},$$

$$k_1=\left[int\left(N^{\frac{1}{3}}\right)\right]^3,$$

$$k_2=\left[int\left(N^{\frac{1}{3}}\right)+1\right]^3,$$

$$\delta_{II}=\sqrt[3]{\frac{\Delta t*\Delta Y*\Delta Z}{N}},$$

-continued $$K_I = \frac{k_I}{\Delta t * \Delta Y * \Delta Z}\delta_I^3 \le 1,$$

$$K_{II} = \frac{k_{II}}{\Delta t * \Delta Y * \Delta Z}\delta_{II}^3 \le 1,$$

N is the Maximum number of data points in the distribution,

Δt is time interval for collecting each of said plurality of three-dimensional time series distributions, ΔY=max(Y)−min(Y) where Y is a magnitude of a first measure of said data points between a maximum and minimum value, and a second measure referred to as Z with magnitude ΔZ=max(Z)−min(Z) where Z is a magnitude of a second measure of said data points between a maximum and minimum value, and int is the integer operator.

* * * * *